(12) United States Patent
Gale et al.

(10) Patent No.: US 6,930,404 B1
(45) Date of Patent: Aug. 16, 2005

(54) POWER SUPPLY FOR AN AUTOMOTIVE VEHICLE

(75) Inventors: Allan Roy Gale, Livonia, MI (US); Michael W. Degner, Novi, MI (US); Paul Raymund Nicastri, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,987

(22) Filed: Sep. 6, 2002

Related U.S. Application Data

(63) Continuation-in-part of application No. 09/682,744, filed on Oct. 12, 2001, now Pat. No. 6,674,180.

(51) Int. Cl.$^7$ .............................................. H01M 14/00
(52) U.S. Cl. ......................... 290/40 C; 290/7; 320/117; 307/45
(58) Field of Search ..................... 290/7, 40 C, 40 D; 322/7, 8; 320/117; 307/45

(56) References Cited

U.S. PATENT DOCUMENTS

| | | | |
|---|---|---|---|
| 4,136,311 A | 1/1979 | Scheidler | |
| 4,742,291 A | * 5/1988 | Bobier et al. | ............... 320/101 |
| 4,779,050 A | * 10/1988 | Ohnari | ........................ 324/426 |
| 4,814,631 A | 3/1989 | Jackson | |
| 5,121,046 A | 6/1992 | McCullough | |
| 5,184,058 A | 2/1993 | Hesse et al. | |
| 5,237,258 A | * 8/1993 | Crampton | ................... 320/126 |
| 5,260,637 A | 11/1993 | Pizzi | |
| 5,373,195 A | 12/1994 | De Doncker et al. | |
| 5,488,283 A | * 1/1996 | Dougherty et al. | ........ 307/10.1 |
| 5,498,950 A | 3/1996 | Ouwerkerk | |
| 5,504,415 A | 4/1996 | Podrazhansky et al. | |
| 5,546,295 A | 8/1996 | Prete et al. | |
| 5,561,360 A | 10/1996 | Ayres et al. | |
| 5,589,743 A | 12/1996 | King | |
| 5,594,634 A | 1/1997 | Rajashekara et al. | |
| 5,610,499 A | 3/1997 | Rogers | |
| 5,710,699 A | 1/1998 | King et al. | |
| 5,712,568 A | 1/1998 | Flohr et al. | |
| 5,717,310 A | 2/1998 | Sakai et al. | |
| 5,723,956 A | 3/1998 | King et al. | |
| 5,734,258 A | 3/1998 | Esser | |
| 5,796,240 A | * 8/1998 | Saito et al. | ................... 322/10 |
| 5,803,215 A | 9/1998 | Henze et al. | |
| 5,889,385 A | 3/1999 | Podrazhansky et al. | |
| 5,903,449 A | 5/1999 | Garrigan et al. | |
| 5,905,360 A | 5/1999 | Ukita | |
| 5,947,093 A | 9/1999 | Ward | |
| 5,965,996 A | * 10/1999 | Arledge et al. | ............. 320/116 |
| 6,023,109 A | 2/2000 | Yang | |
| 6,031,355 A | 2/2000 | Rich | |
| 6,044,922 A | 4/2000 | Field | |
| 6,075,331 A | 6/2000 | Ando et al. | |
| 6,140,799 A | 10/2000 | Thomasson | |
| 6,157,165 A | 12/2000 | Kinoshita et al. | |
| 6,194,875 B1 | 2/2001 | Takimoto et al. | |
| 6,204,652 B1 | 3/2001 | Albou et al. | |
| 6,230,496 B1 | 5/2001 | Hofmann et al. | |
| 6,239,996 B1 | 5/2001 | Perreault et al. | |
| 6,265,851 B1 | 7/2001 | Brien et al. | |
| 6,268,666 B1 | 7/2001 | Bhowmik | |
| 6,275,004 B1 | 8/2001 | Tamai et al. | |
| 6,313,637 B1 | 11/2001 | Iino et al. | |
| 6,314,006 B1 | 11/2001 | Berberich et al. | |
| 6,326,765 B1 | * 12/2001 | Hughes et al. | ............... 320/104 |
| 6,713,890 B2 | * 3/2004 | Kondo et al. | ............. 290/40 B |

\* cited by examiner

*Primary Examiner*—Nicholas Ponomarenko
(74) *Attorney, Agent, or Firm*—Artz & Artz, P.C.; Carlos L. Hanze

(57) ABSTRACT

An electrical system (12) is provided for an automotive vehicle (10) having a first power source (14) with a first positive terminal (16) and first negative terminal (18). A second power source (20) having a second positive terminal (22) and a second negative terminal (24) is also provided. A common electrical node $N_2$ is coupled to the first negative terminal and the second positive terminal. A first load (26) is coupled between the first positive terminal and the second node $N_2$. A second load (30) is coupled to the positive terminal. A switch (SW3) is coupled to the second positive terminal (22), the second negative terminal (24) and the second load (30). The switch (SW3) has a first position electrically coupling the second load to the second positive terminal and a second position electrically coupling the second negative terminal to the second load (30).

20 Claims, 6 Drawing Sheets

POWER SUPPLY FOR AN AUTOMOTIVE VEHICLE

CROSS REFERENCE TO RELATED APPLICATIONS

The present application is a continuation-in-part application of U.S. patent application Ser. No. 09/682,744 filed on Oct. 12, 2001 now U.S. Pat. No. 6,674,180, and is entitled "Power Supply For An Automotive Vehicle Using DC-To-DC Converter For Charge Transfer", filed simultaneously herewith, both of which are incorporated by reference herein.

BACKGROUND OF INVENTION

The present invention relates generally to an electric distribution system, and more particularly, to an electric distribution system suitable for automotive applications.

Currently, the automotive industry is preparing to convert from a 14 volt electrical system to 42 volts to facilitate the increasing demand for electrical power. Various manufacturers of electrical components have and are currently designing 42 volt systems.

Integrated starter/motors or integrated starter/generators are also being proposed for automotive vehicles. Current plans employ the 42 volt system for the operation of the integrated starter/generators. However, during start up motoring, low voltage and high currents can occur. The low voltage and high current may change the performance and decrease the life of electrical components within the electrical system. Components that may be adversely affected may have to be designed to be more robust. This may increase the cost of the system and the vehicle.

It would therefore be desirable to provide an electrical architecture suitable for powering an integrated starter/generator while still allowing the system to utilize current 42 volt components.

SUMMARY OF INVENTION

The present invention provides an improved electrical system suitable for use in a hybrid electric vehicle.

In one aspect of the invention, an electrical system for an automotive vehicle having a first power source with a first positive terminal and first negative terminal. A second power source having a second positive terminal and a second negative terminal is also provided. A common electrical node $N_2$ is coupled to the first negative terminal and the second positive terminal. A first load is coupled between the first positive terminal and the second node $N_2$. A second load is coupled to the positive terminal. An integrated motor generator is coupled to the inverter. A switch is coupled to the second positive terminal, the second negative terminal and the inverter. The switch has a first position electrically coupling the inverter to the second positive terminal and a second position electrically coupling the second negative terminal to the inverter.

In a further aspect of the invention, a method for operating an electrical system for an automotive vehicle comprises operating a first load with a first power source, electrically coupling a first power source and a second power source, and selectively coupling a first terminal or a second terminal of a second power source to an inverter in response to a sensed condition.

One advantage of the invention is that during cold operating conditions current draw on the system will not be as great as in a single power source system.

Other advantages and features of the present invention will become apparent when viewed in light of the detailed description of the preferred embodiment when taken in conjunction with the attached drawings and appended claims.

DETAILED DESCRIPTION

The following description is provided with respect to a hybrid electrical vehicle. However, those skilled in the art will recognize that this system may be used with other types of electrical or hybrid electric vehicles.

Figure 1:
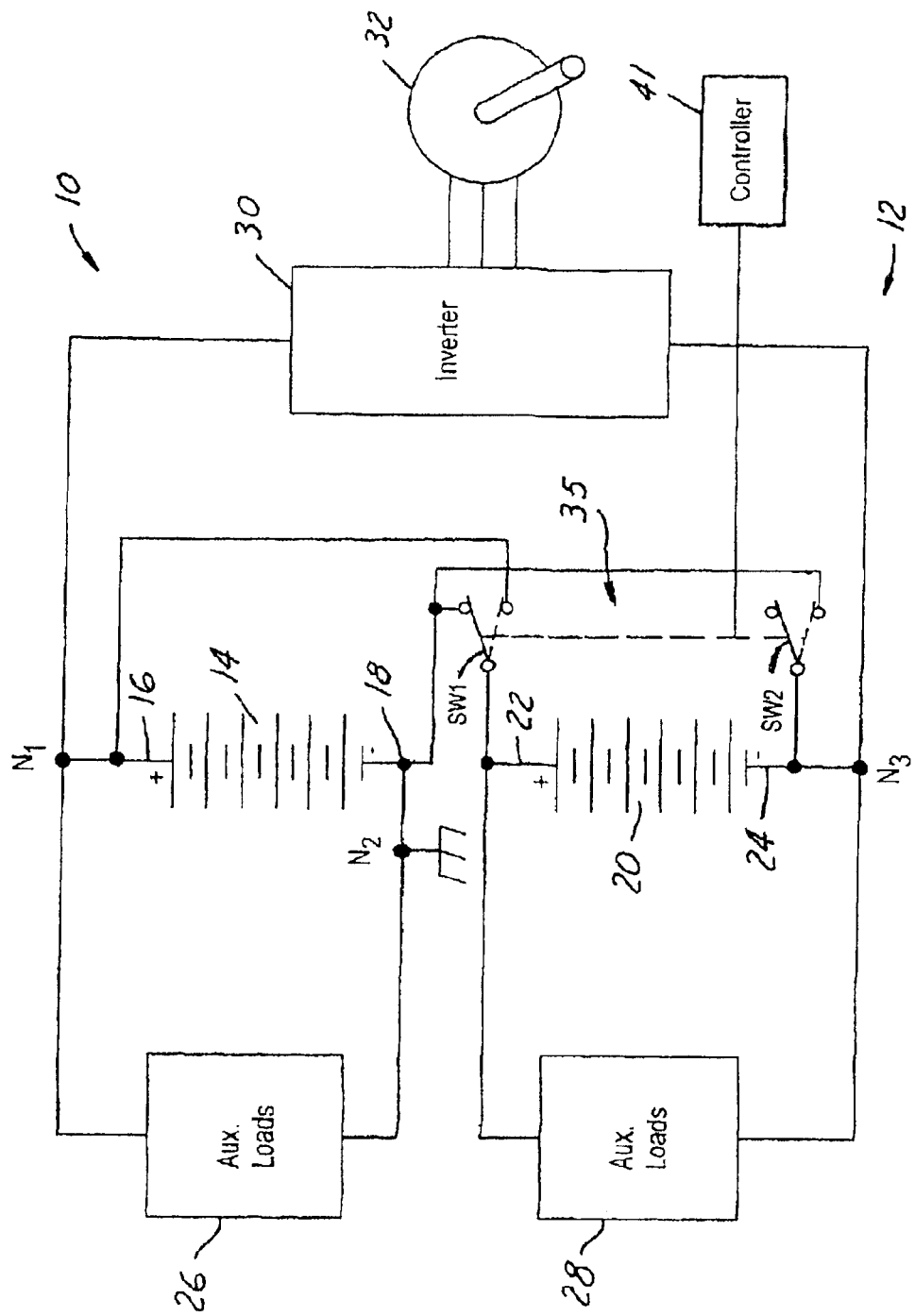
FIG. 1 is a schematic view of an electrical system for an automotive vehicle according to the present invention.

Referring now to FIG. 1, a hybrid electrical vehicle 10 is illustrated having an electrical system 12. Electrical system 12 has a first power source 14 having a positive terminal 16 and a negative terminal 18. Electrical system 12 also has a second power source 20 having a positive terminal 22 and a negative terminal 24. First power source 14 and second power source 20 are preferably direct current batteries generating 42 volts. Those skilled in the art, however, will recognize that various other voltages may be suitable. Also, first power source 14 and second power source 20 are illustrated as separate components. However, each of the power sources may be included physically in one box or location with three or four terminals.

First power source 14 may be coupled to a first auxiliary load 26 and second power source 20 may be coupled to power a second auxiliary load 28. Auxiliary loads 26 and 28 may each include various devices and components located throughout the vehicle including power steering systems, air conditioning systems, power windows, audio equipment, heated seats, and other devices. First positive terminal 16 is coupled to a common node $N_1$ which in turn is coupled to one side of auxiliary load 26. Negative terminal 18 is coupled to a second node $N_2$. Second node $N_2$ is also coupled to auxiliary load 26. Node $N_2$ is also coupled to the positive terminal 22 of second power source 20 and auxiliary load 28. Negative terminal 24 is coupled to node $N_3$. Node $N_3$ is also coupled to auxiliary load 28.

Node $N_2$ may also be referred to as the chassis ground. That is, the chassis of the automobile may have its metal conducting loads electrically connected to node N 2 This allows both auxiliary load 26 and auxiliary load 28 to be operated by two batteries in parallel. Each auxiliary load 26 and 28 thus operates on a 42 volt source because the potential difference between the battery terminals is 42 volts in the present example. It should be noted that a 42 volt system may be implemented using three 12 volt batteries in series which operate as a system voltage of about 14 volts.

Another load such as an inverter 30 is coupled to the series combination of first power source 14 and second power source 20. That is, inverter 30 is coupled to node $N_1$ and node $N_3$ or the first positive terminal 16 and the second negative terminal 24. Inverter 30 is used to operate motor generator 32 that is coupled thereto. Motor generator 32 may also be referred to in the art as an integrated starter/alternator or starter/alternator. By coupling inverter 30 between nodes $N_1$ and $N_3$, inverter 30 operates on the combined voltage of power source 14 and power source 20. In the present example, inverter may thus operate on 84 volts.

In an alternative embodiment of the present invention, a switch circuit 35 having switches SW1 and SW2 and a switch controller 41 may be coupled to the circuit. Switches SW1 and SW2 open and close causing the coupling and decoupling of power source 20 to node $N_2$. That is, switch circuit 35 causes batteries 14, 20 to switch from serial to parallel which may be advantageous during certain operating conditions. Switch SW1 couples terminal 22 between chassis ground and terminal 16. Switch SW2 couples or decouples between negative terminal 24 of power source 20 to chassis ground of node $N_2$. In operation during a regular mode, switches SW1 and SW2 are shown in the solid position so that power source 14,20 are in series. Controller 41 simultaneously controls the operation of switches SW1 and SW2. By operating switches SW1 and SW2 in a non-motoring mode, first power source 14 and second power source 20 operate in parallel shown in dashed lines. That is, controller 41 senses a predetermined condition such as a non-motoring mode and operates the switches. Controller 41 controls the switching of switches simultaneously. Of course, those skilled in the art will recognize various placements and embodiments of switches will allow the changing from a series to parallel system.

Figure 2:
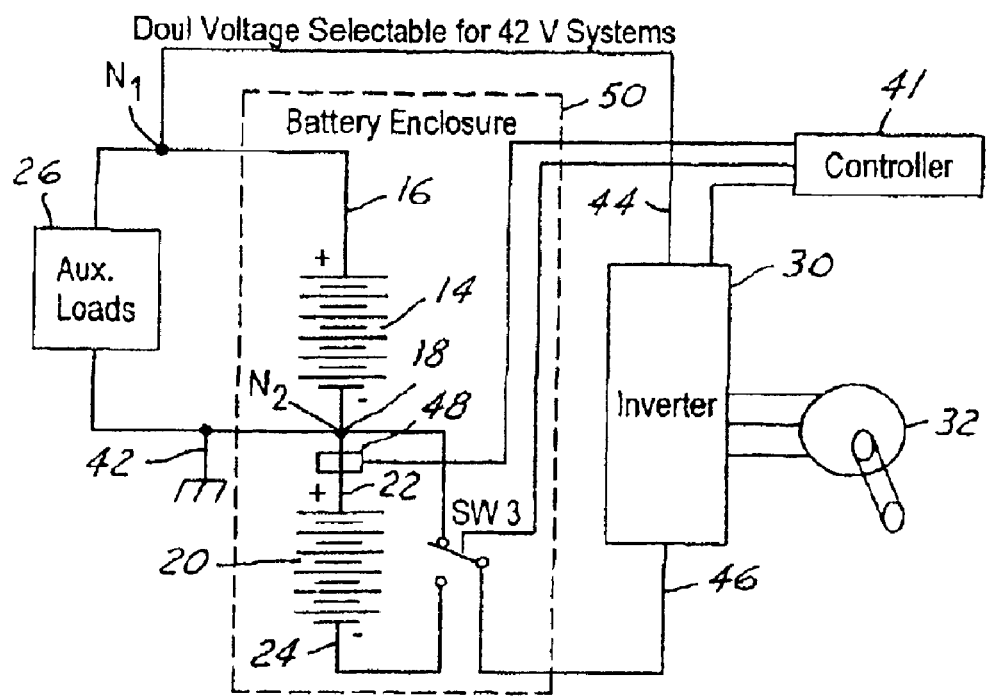
FIG. 2 is a schematic view of a second alternative embodiment of the present invention that includes one auxiliary load and a single switch.

Referring now to FIG. 2, a similar embodiment to that shown in FIG. 1 is illustrated. In this embodiment and all of the following embodiments the same reference numerals will be used to identify the same components. In this embodiment one auxiliary load 26 is illustrated coupled to common node N2 which is coupled to chassis ground 42. That is, auxiliary load 28 is not present in this embodiment. Inverter 30 has a first terminal 44 and a second terminal 46. In this embodiment second terminal 46 of inverter 30 is coupled to a switch SW3 rather than to a common node 3 as illustrated in FIG. 1. Switch SW3 is also coupled to second positive terminal 22 and second negative terminal 24. Controller 41 is operably connected to switch SW3 so that second inverter terminal 46 may be coupled between the second positive terminal 22 and the second negative terminal 24 in response to a predetermined condition determined by controller 41. A sensor 48 may also be coupled to second positive terminal 22 of second power source 20.

In the operation of the embodiment illustrated in FIG. 2, switch SW3 is used to couple either 42 volts or 84 volts to inverter 30 when the power sources are so sized. That is, the inverter 30 typically requires more voltage during starting and motoring and thus the present invention may sense a start or motoring condition through inverter 30. After the engine is started switch SW3 may be left in a start mode while the motor/generator 32 is used to generate power to auxiliary loads 26, the first power supply 14, and the second power supply 20. When used as a generator, motor/generator 32 will divide its current between auxiliary load 26 and power source 14 in parallel, and power source 20. Thus, power source 14 and power source 20 may be charged. When the second power source 20 is fully charged as sensed by battery sensor 48, the switch may be positioned in the position illustrated so that the chassis ground 42, and thus the second positive terminal 22, is electrically coupled to the second terminal 46 of inverter 30.

In this embodiment, the first power source 14, second power source 20 may be positioned in a common battery enclosure 50. The battery enclosure 50 may also include switch SW3 therein.

Of course, inverter 30 may include a capacitor bank therein. Thus, the impedance between the capacitor bank within inverter 30 and the power sources 14 and 20 may affect the operation of switch SW3.

It should also be noted that switch SW3 is preferably implemented in a solid state switch.

Figure 3:
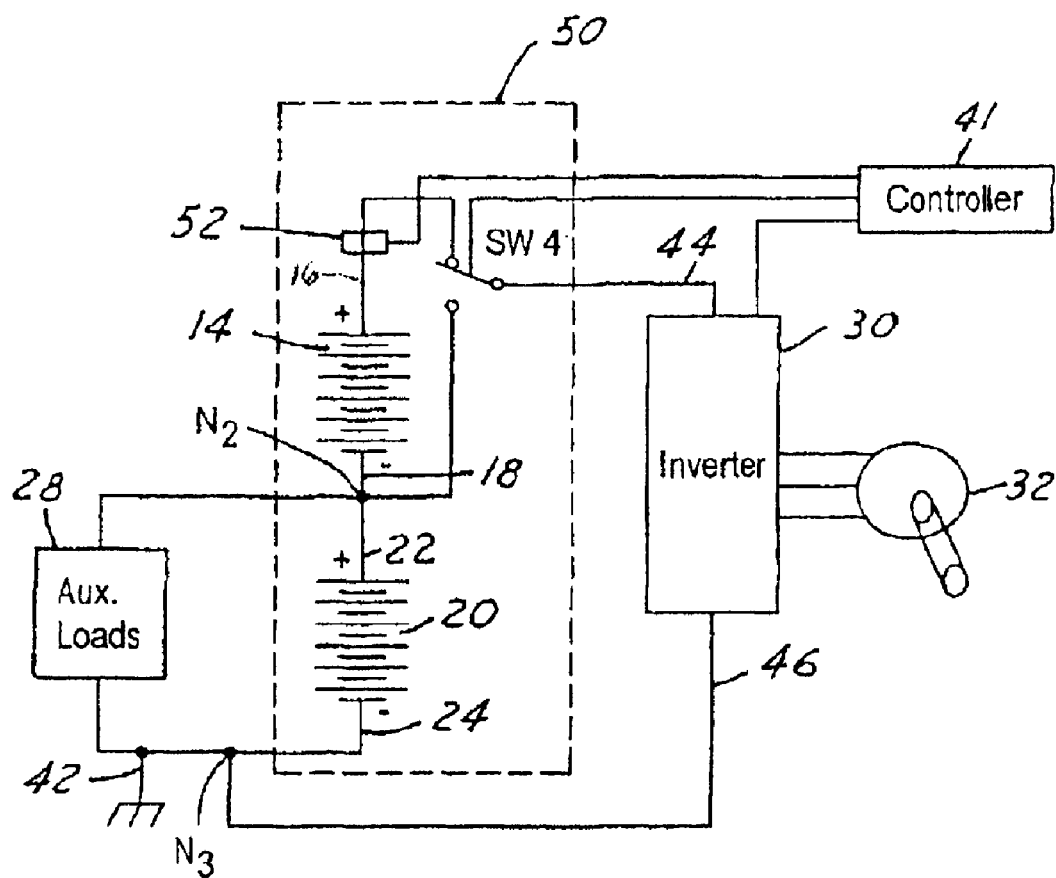
FIG. 3 is a schematic view similar to that of FIG. 2 having the switch placement moved to the first power source.

Referring now to FIG. 3, a similar embodiment to that shown in FIG. 2 is illustrated. In this embodiment, auxiliary load 28 is coupled to power source 20. This embodiment operates in a similar manner to that described above with respect to FIG. 2. In this embodiment, a sensor 52 may monitor the state of charge of the first power source 14. That is, sensor 52 may be coupled to the first positive terminal 16 of power source 14. A switch SW4 is coupled to the first terminal 44 of inverter 30 and to first positive terminal 16 and first negative terminal 18 of power source 14. Thus, during start up or motoring, controller 41 controls the position of switch so that both power sources 14 and 20 are coupled to inverter 30 to provide combined voltage thereto. As described above the combined voltage is preferably 84 volts. When the power source 14 has been recharged, switch SW4 connects the common node N2 to first inverter terminal 44. In this embodiment, chassis ground 42 is coupled to second negative terminal 24 rather than to node N2.

In this embodiment, power source 14, power source 20, and switch SW4 are preferably located within battery enclosure 50.

Figure 4:
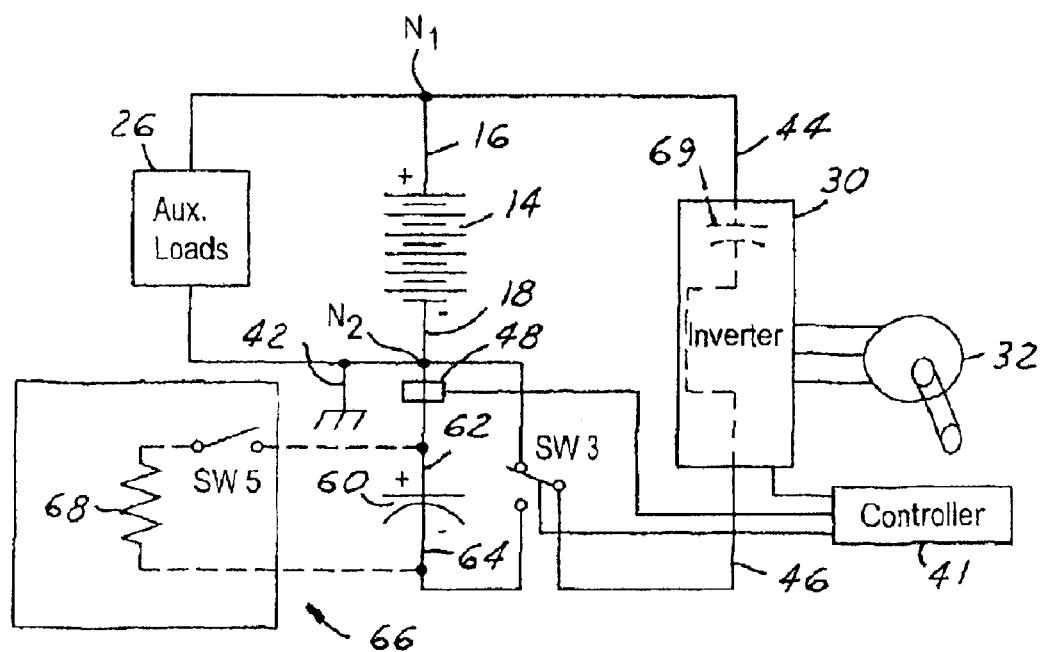
FIG. 4 is a schematic view of a fourth embodiment of the invention having an ultra capacitor in place of the second battery for the second power source.

Referring now to FIG. 4, a similar embodiment to that shown in FIG. 1 is illustrated. In this embodiment the second power source is a capacitor 60 or ultra capacitor. Capacitor 60 has a first positive terminal 62 and a second negative terminal 64 that are positioned in a similar manner to that illustrated in the above figures. Switch SW3 operates in a similar manner to that described above with respect to FIG. 2. That is, switch SW3 may be used to place the ultra capacitor 60 in series with first power source 14 during starting. Once the engine is started the generator 32 will provide the current that passes through the auxiliary loads 26 in parallel with power source 14 and capacitor 60. This allows ultra capacitor 60 to be recharged. Switch SW3 may change position in response to being fully charged as sensed by sensor 48. That is, switch SW3 will change to a position where node N2 is coupled to the second terminal 46 of inverter 30 after ultra capacitor 62 is charged. Thus, ultra capacitor 62 will be available to provide energy to motor generator 32 upon the next restart.

The present embodiment also provides a discharge circuit 66 coupled in parallel with ultra capacitor 60. Discharge circuit 66 includes a switch SW5 and a load 68. Upon the activation of switch SW5 such as during or prior to a servicing mode, ultra capacitor 60 is discharged through load 68. The resistance of load 68 may be chosen to limit the peak discharge current.

Discharge circuit 66 may also include an inverter capacitor 69 which as an integral part of inverter 30 rather than switch SW5 and load 68. By switching switch SW3 charge can be transferred to capacitor 69 from capacitor 60.

Figure 5:
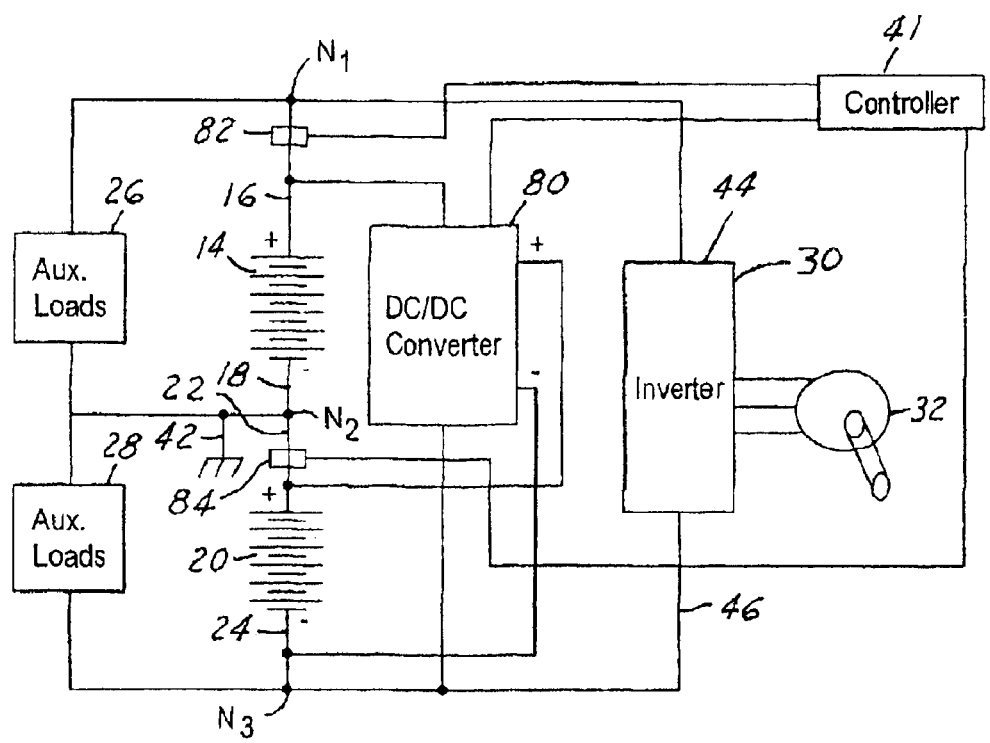
FIG. 5 is a schematic view of a fifth embodiment of the invention utilizing a DC-to-DC converter.

Referring now FIG. 5, an embodiment similar to that of FIG. 1 without switches SW1 and SW2 is illustrated. In this embodiment, a DC-to-DC converter 80 is used in the circuit to balance the loading between the first power source 14 and the second power source 20. That is, DC-to-DC converter is electrically coupled to the first positive terminal 16 and thus node N1, to the second common node N2 or the second positive terminal 22 of second power source 20 and to the second negative terminal 24 or the node N3 that includes the second terminal 46 of inverter 30. Sensors 82 and 84 are coupled to the first positive terminal 16 and the second positive terminal 22 and to controller 41. Controller 41 may be used to control the operation of DC-to-DC converter 80. That is, upon sensing the amount of charge at each of the power sources 14 through respective sensors 82 and 84, DC-to-DC converter may control the charging of either one of the power sources when either one of the power sources has a low state of charge when DC-to-DC converter 80 is a bi-directional DC-to-DC converter. Thus, energy may be moved from one power source to the other power source to prevent depletion and also to prevent overcharging.

Figure 6:
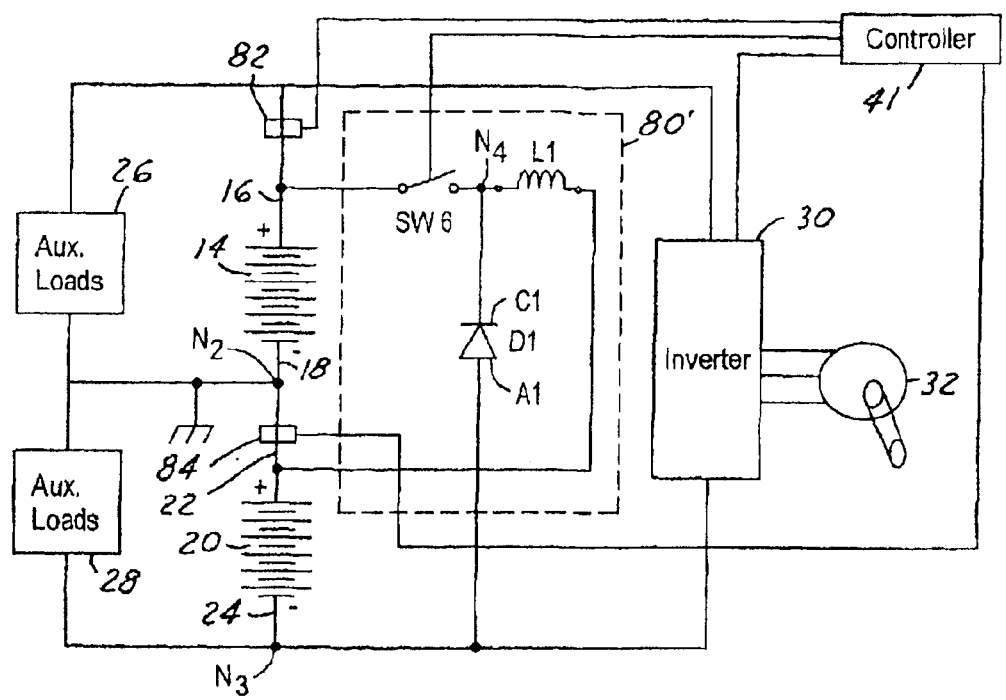
FIG. 6 is a sixth embodiment of the invention wherein the DC-to-DC converter is a unidirectional DC-to-DC converter.

Referring now to FIG. 6, a unidirectional DC-to-DC converter 80" is illustrated. Because of the position of the batteries and the nature of the charging circuit, power source 14 may be subject to overcharging. Thus, unidirectional DC-to-DC converter 80" may move energy from the first power source 14 to the second power source 20.

In this embodiment, unidirectional DC-to-DC converter 80" comprises a switch SW6 coupled between the first positive terminal 16 and a common node N4. The common node N4 is coupled to a diode D1 having an anode A1 and a cathode C1.

That is, the cathode C1 is coupled to common node N4. Anode A1 is coupled to common node N3 or second negative battery terminal 24. Common node N4 also has an inductor L1 coupled thereto. The other side of inductor L1 is coupled to the second positive terminal 22. Switch SW6 is operably coupled to controller 41. That is, upon sensing the charge of batteries 14,20 through respective sensors 82 and 84, controller 41 may close and move energy to second power source 20. This may continue until controller 41 senses through sensor 84 that the second power source is charged.

Advantageously, the above embodiments allow an inverter to operate using both power sources while starting the engine or motoring. Thereafter, the inverter 30 may operate using only one of the power sources.

While particular embodiments of the invention have been shown and described, numerous variations and alternate embodiments will occur to those skilled in the art. Accordingly, it is intended that the invention be limited only in terms of the appended claims.

What is claimed is:

1. A power supply system for an automotive vehicle comprising:
    a first power source having a first positive terminal and a first negative terminal;
    a second power source having a second positive terminal and a second negative terminal;
    a common electrical node between the first power source and the second power source;
    a first load coupled between said first positive terminal and said common node;
    a second load coupled to said first positive terminal;
    an inverter;
    a switch coupled to said second positive terminal, said second negative terminal and said inverter, said switch having a first position electrically coupling said second load to said second positive terminal and a second position electrically coupling said second negative terminal to said second load; and
    a controller coupled to said switch controlling the switching of said switch in response to a predetermined condition.

2. A power supply system as recited in claim 1 wherein the predetermined condition comprises the second power source being charged.

3. A power supply system as recited in claim 2 further comprising a sensor coupled to said first terminal of said second power source and said controller.

4. A power supply system as recited in claim 1 wherein the first power source and the second power source are disposed with an enclosure.

5. A power supply system as recited in claim 4 wherein said switch is disposed within the enclosure.

6. A power supply system as recited in claim 1 wherein the second power source comprises a capacitor.

7. A power supply system as recited in claim 6 wherein said capacitor comprises an ultra capacitor.

8. A power supply system as recited in claim 6 further comprising a service discharge circuit coupled to said capacitor.

9. A power supply system as recited in claim 8 wherein said service discharge circuit is coupled in parallel to said capacitor.

10. A power supply system as recited in claim 8 wherein said service discharge circuit comprises a switch selectively coupling an inverter capacitor to said capacitor.

11. A power supply system as recited in claim 1 wherein the common node is coupled to a chassis ground.

12. A power supply system as recited in claim 1 wherein the second terminal of the first power source is coupled to a chassis ground.

13. A power supply system as recited in claim 1 wherein said second load comprises an inverter and a motor.

14. A power supply system as recited in claim 1 wherein said first power source has a first voltage rating and said second power source has a second voltage rating equal to said first voltage rating.

15. A method of operating an electrical system for an automotive vehicle comprising:
    operating a first load with a first power source;
    electrically coupling said first power source and a second power source; and
    selectively coupling a first terminal or a second terminal of a second power source to an inverter in response to a sensed condition.

16. A method as recited in claim 15 wherein selectively coupling comprises selectively coupling in response to a charge of the second power source.

17. A method as recited in claim 15 wherein electrically coupling the first power source and the second power source comprises forming a common node between said first power source, said second power source.

18. A method as recited in claim 15 further comprising discharging the second power source prior to servicing.

19. A method as recited in claim 18 wherein discharging comprises coupling the second power source to a load.

20. A power supply system for an automotive vehicle comprising:
    a first power source having a first positive terms and a first negative terminal;
    a second power source having a second positive terminal and a second negative terminal;

a common electrical node between the first power source and the second power source;

a first load coupled between said first positive terminal and said common node;

an inverter coupled to said first positive terminal;

an integrated motor generator coupled to said inverter;

a switch coupled to said second positive terminal, said second negative terminal and said inverter, said switch having a first position electrically coupling said inverter to said second positive terminal and a second position electrically coupling said second negative terminal to said inverter; and a controlled coupled to said switch controlling the switching of said switch in response to a predetermined condition.

* * * * *